United States Patent [19]
Leitzel et al.

[11] 4,250,539
[45] Feb. 10, 1981

[54] SUPPORTING MEANS FOR AN ELECTRICAL CIRCUIT

[76] Inventors: William O. Leitzel, 58 Sycamore Ave., Mill Valley, Calif. 94941; Tom Thinesen, 512 S. Cashmere Ter., Sunnyvale, Calif. 94087

[21] Appl. No.: 13,394

[22] Filed: Feb. 21, 1979

[51] Int. Cl.³ .................................... B62J 5/00
[52] U.S. Cl. .................................... 362/196; 362/200; 362/362
[58] Field of Search .................................... 362/200, 196, 362

[56] References Cited

U.S. PATENT DOCUMENTS 1,187,574 6/1916 Wachtel .................................... 362/201

*Primary Examiner*—Stephen J. Lechert, Jr.

[57] ABSTRACT

A support for an electrical circuit such as that in a flashlight is provided so as to be powered by a four layer carbon-zinc battery of the type that is normally discarded with the rest of the apparatus used in an instant camera. The battery and housing are shaped so that the assembly is about wallet size and so that circuit may be energized simply by reciprocating the battery within the support.

4 Claims, 6 Drawing Figures

Fig. 1.
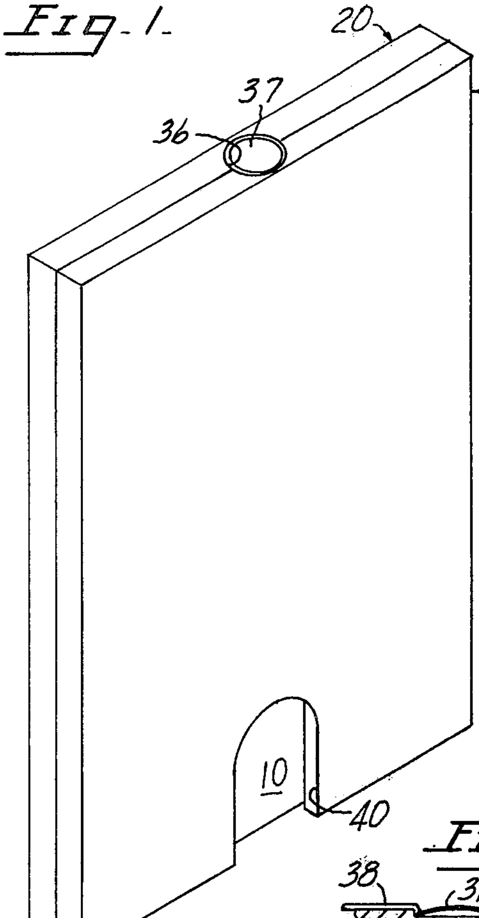
Fig 3
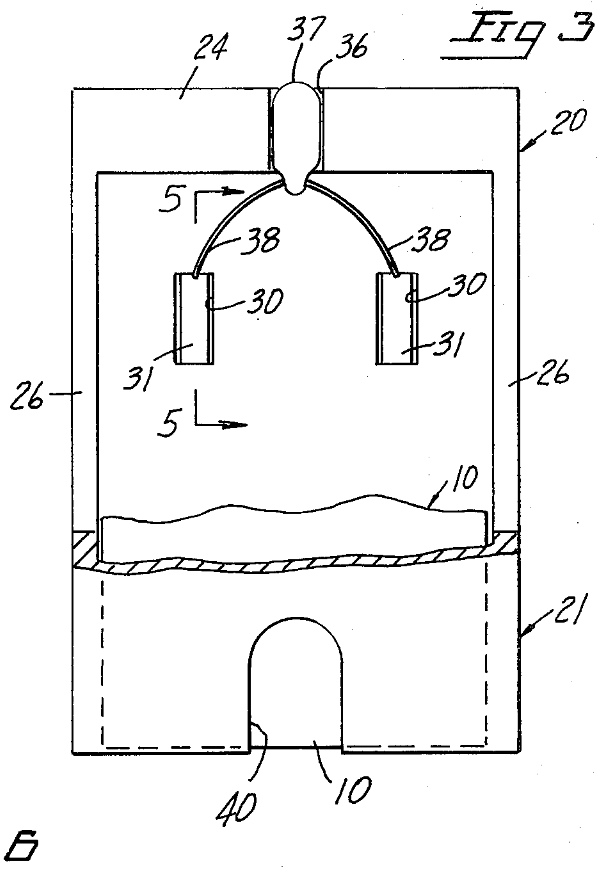
Fig. 6
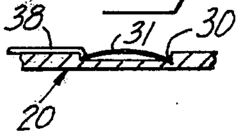
Fig. 2
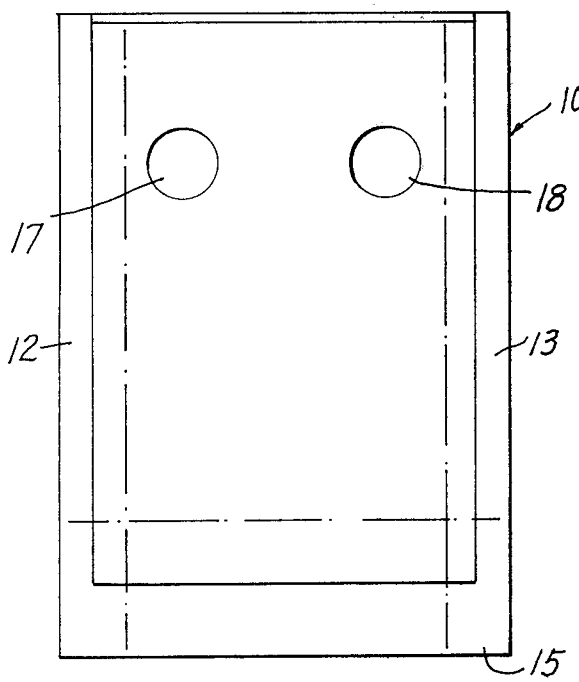
Fig 4
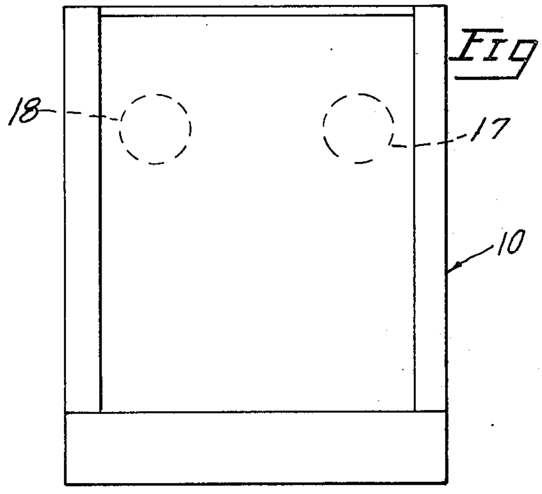
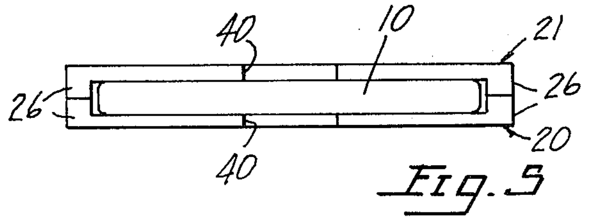
Fig. 5

SUPPORTING MEANS FOR AN ELECTRICAL CIRCUIT

This invention relates to a support for an electrical circuit which is particularly adapted for use with a circuit powered by a four layer carbon-zinc battery of the type used to power an instant camera of the type sold under the trademark "POLAROID". Although the invention will be described with respect to its use as a flashlight, it will be apparent that it is adapted for use in other types of circuitry.

As is well know, modern instant cameras employ a power pack in the form of a generally rectangular four layer carbon-zinc battery which has a thickness of about one-eighth inch. Such batteries permit optimum discharge when required in the functions of an instant camera. However, the capacity of these batteries is always overdesigned so that they are always able to carry out their functions. However, when the film pack has been used up the apparatus remaining, including the battery, is normally discarded.

It is the main object of the present invention to provide a support for a circuit which permits use of the power of the battery even after it has been employed for its designed purpose.

Another object of the invention is to provide a circuit supporting means which is relatively compact and not any greater than wallet size and thus readily carried by the user.

Another object of the invention is the provision of a circuit supporting means which can be employed as a flashlight and in which the circuit may be completed simply by reciprocating the battery.

Other objects and advantages will be apparent from the following specification and from the drawings.

FIG. 1 is a perspective of the invention.

FIG. 2 is a plan view of a typical four layer carbon-zinc battery used in instant cameras.

FIG. 3 is a plan view of the device of FIG. 1 but with one side and the battery broken away to show internal structure.

FIG. 4 is a plan view similar to FIG. 2 showing the battery in actual use.

FIG. 5 is an end view of the device of FIG. 3.

FIG. 6 is a fragmentary cross-section through one of the contacts.

First with reference to FIG. 2 a conventional four layer carbon-zinc battery generally designated 10 is provided with a paper-like wrapper which includes a pair of opposite marginal portions 12, 13 and an end portion 15. The wrapper of the battery is also provided with a pair of spaced apart openings for uncovering a pair of terminals 17, 18. In normal use these terminals are engaged to close the circuit of the instant camera.

In order to make the battery 10 more convenient to use in the present invention the marginal portions 12, 13 may be folded over the body portion of the battery and the lower flap 15 may also be folded over so that the three edges are swung to the dot-dash positions of FIg. 2 so as to result in the configuration of FIG. 4 wherein the opposite side of the battery is shown from FIG. 2.

FIGS. 1, 3 and 5 show one form of the invention wherein the supporting means or housing is employed to provide a flashlight. In the embodiment shown a housing is provided having a pair of identical opposite sides 20, 21 secured together by adhesive at their margins. At their upper ends said sides are provided with thicker portions 24 and along their edges with thicker marginal portions 26 so as to provide a central cavity opening outwardly of the bottom end of the housing to accomodate the battery 10. Thus, as best seen in FIG. 3, the battery 10 may be slid into the housing from the open end of the latter to the position of FIGS. 1 and 3. As best seen in FIG. 6, each side is provided with an inwardly opening rectangular recess 30 into which may be snapped a leaf spring contact 31 so that the central portion of said contact projects slightly inwardly of the inner face of the associated side.

In the end portion 24 of each side there is formed a semi-cylindrical recess 36 so that both recesses cooperate to form a cylindrical opening adapted to receive a lamp 37 therein. Lamp 37 may be of the type having a pair of connectors 38 which may be secured as by soldering to the contacts 31.

Each side 20, 21 is provided with a slot 40 so that the thumb and forefinger of a person inserting the battery 10 may be employed to reciprocate the battery along the length of the housing as desired. When the battery is shown in the position of FIGS. 1 and 3 the terminals 17, 18 are out of contact with the contacts 31. However, when the battery is pushed inwardly of the housing the terminals 17, 18 engage the contacts 31 so as to complete the circuit to illuminate the lamp 37.

It will be understood that more than ample power is provided in the battery to perform its normal functions in the camera, and when discarded the battery has sufficient power left to illuminate a lamp many times before the power is exhausted.

It will also be noted that the shape of the device herein disclosed permits it to be slipped into a person's pocket since it is no larger than a conventional wallet. In this connection it is preferable that the battery has a snug fit with the interior cavity of the housing so that it does not move inadvertently to close the circuit.

We claim:

1. Supporting means for an electrical circuit comprising:

a generally rectangular battery having a thickness less than one-fourth inch and provided with a pair of output terminals, a relatively flat housing having a pair of opposite generally rectangular sides, means securing said sides together in spaced apart relation and spacing said sides apart a distance about equal to the thickness of said battery, an electrical circuit, said circuit having a pair of normally open contacts supported by said housing, said battery being slidable in said housing toward and away from said contacts for engaging and disengaging said contacts relative to said terminals for closing and opening said circuit.

2. A device according to claim 1 wherein said electrical circuit includes a lamp adapted to be illuminated when said circuit is closed.

3. A device according to claim 2 wherein said battery is of carbon-zinc.

4. A device according to claim 2 wherein said battery is a four layer carbon-zinc battery.

* * * * *